May 23, 1944.  H. ORNER  2,349,370
RADIANT ENERGY LOCATING SYSTEM
Filed Sept. 19, 1940  4 Sheets-Sheet 1

INVENTOR
Harry Orner

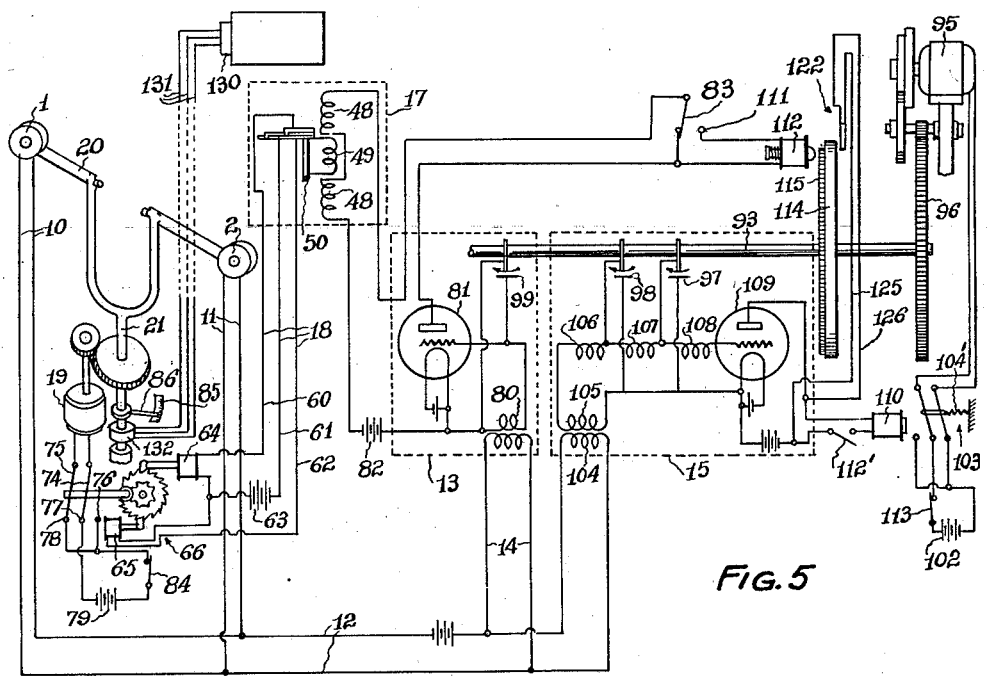
Fig. 5
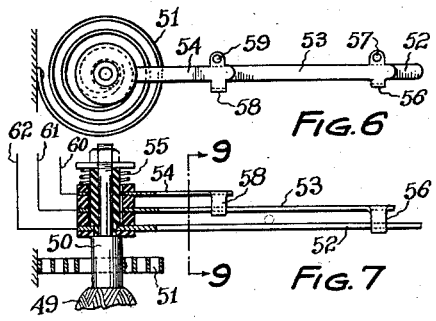
Fig. 6
Fig. 7
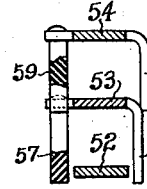
Fig. 9
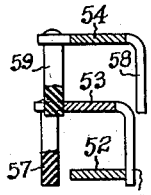
Fig. 10
Fig. 11
Fig. 8
Fig. 12
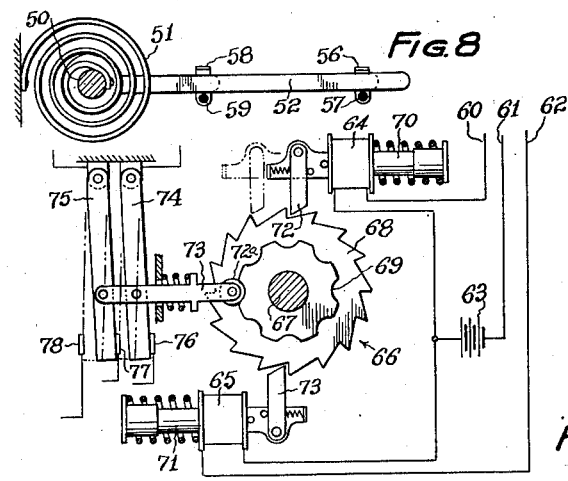
Fig. 13
INVENTOR
Harry Orner May 23, 1944.　　　　　H. ORNER　　　　　2,349,370
RADIANT ENERGY LOCATING SYSTEM
Filed Sept. 19, 1940　　　4 Sheets-Sheet 3

INVENTOR
Harry Orner

May 23, 1944.  H. ORNER  2,349,370
RADIANT ENERGY LOCATING SYSTEM
Filed Sept. 19, 1940  4 Sheets-Sheet 4
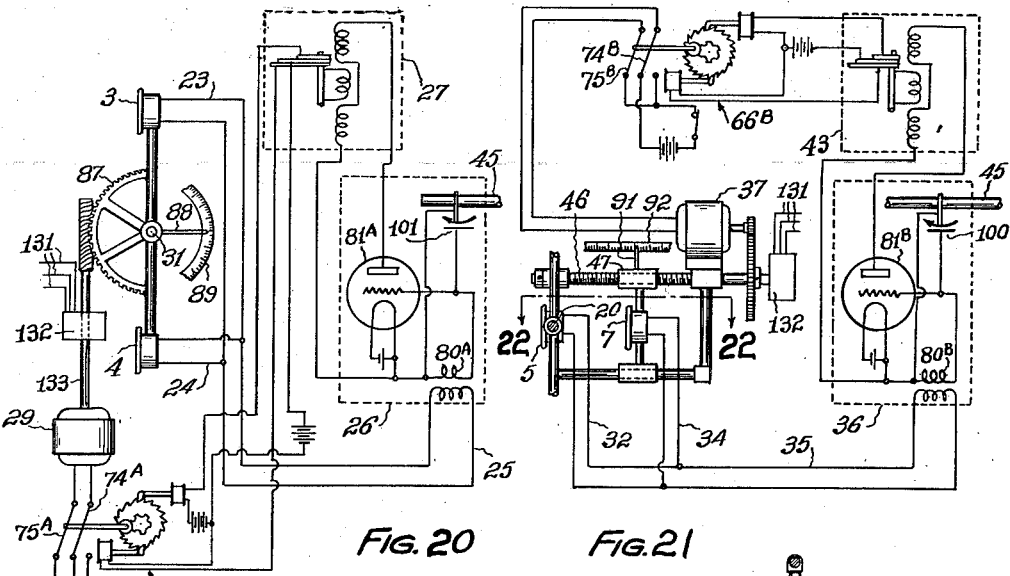
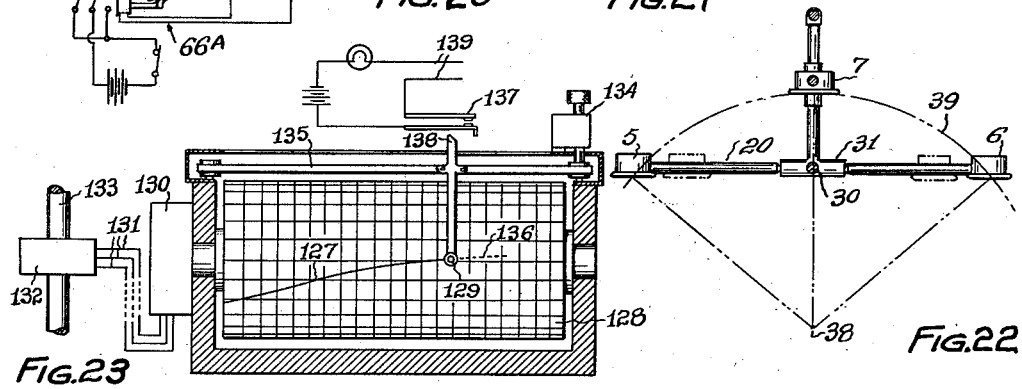
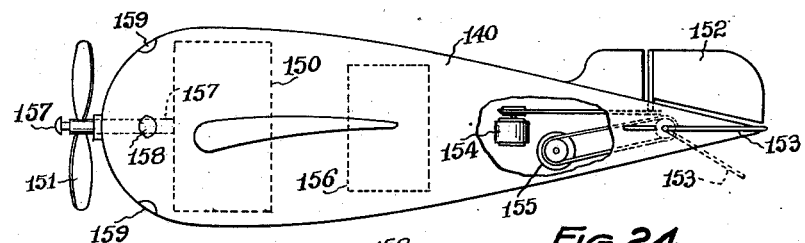
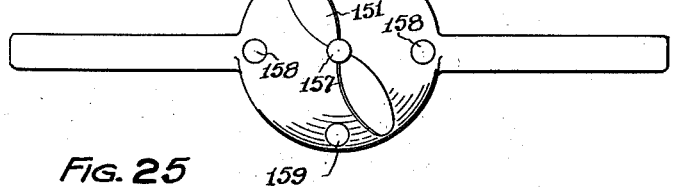
INVENTOR
Harry Orner Patented May 23, 1944

2,349,370

UNITED STATES PATENT OFFICE 2,349,370

RADIANT ENERGY LOCATING SYSTEM

Harry Orner, Cleveland Heights, Ohio

Application September 19, 1940, Serial No. 357,360

6 Claims. (Cl. 177—352)

This invention relates to apparatus for detecting and indicating the direction and distance away of a source of radiant energy with respect to the position of the apparatus.

Reference is made to copending application filed December 31, 1943, for, Automatic tuning apparatus, Serial Number 516,554. This copending application is a division of the subject matter included in this application.

The primary object of this invention is to provide an apparatus for automatically determining and indicating the position and distance away of a source of radiant energy.

Other objects of the invention are:

To provide an improved apparatus for accomplishing the purposes referred to and responding in an improved manner to the frequency of the sound wave emanating from the source of sound;

To provide an apparatus of the class referred to having improved means for automatically tuning itself to the frequency of the radiant energy wave emanating from the source of radiant energy and to tune out all other frequencies;

Another object is to provide an apparatus of the class referred to automatically responding to the radiant energy waves emanating from a source of radiant energy and having means to indicate upon a chart, the path of movement of the source of radiant energy in space;

To provide an apparatus responding to the direction of the sound waves emanating from a source of sound and which apparatus may be mounted upon a self-propelled vehicle to automatically steer the vehicle toward the source of sound;

To provide an apparatus detecting the position in space of a source of sound such as that emanating from an airplane and which apparatus may be mounted upon a self-propelled projectile or the like and comprising means for steering the projectile toward the airplane.

Other objects will be apparent to those skilled in the art to which my invention pertains.

My invention is fully disclosed in the following description taken in connection with the accompanying drawings in which, Fig. 1 is a diagrammatic view illustrating apparatus and an electric system embodying my invention;

Fig. 5 is a view similar to a part of Fig. 1 but illustrating the apparatus and electric circuits thereof in more detail;

Figure 1:
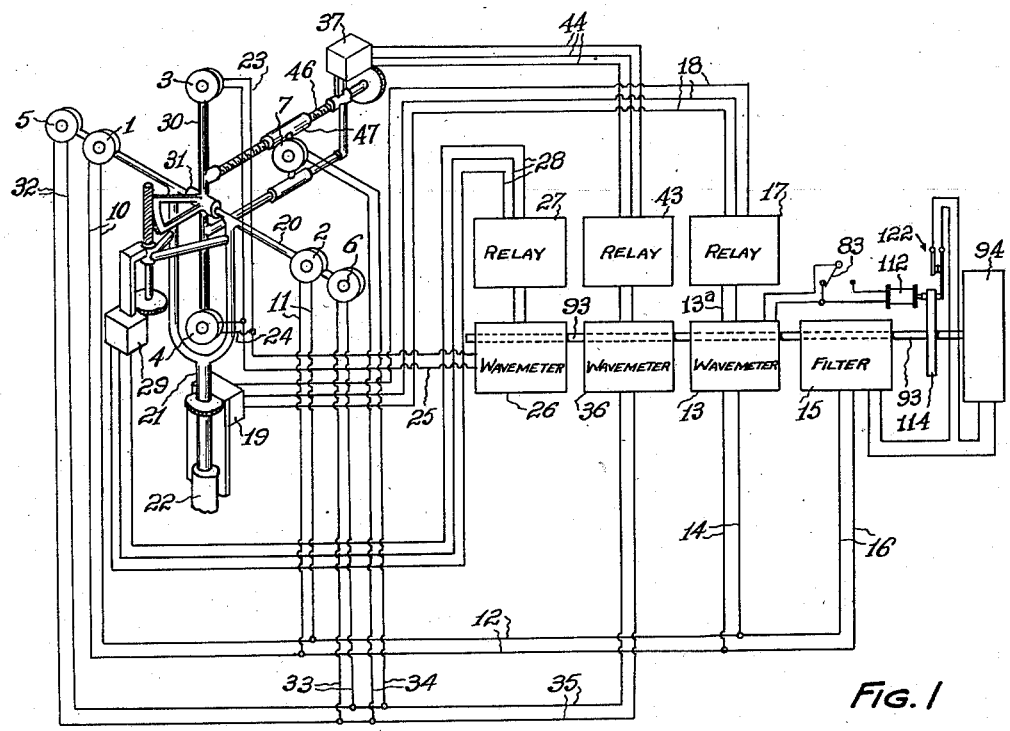
Figure 15:
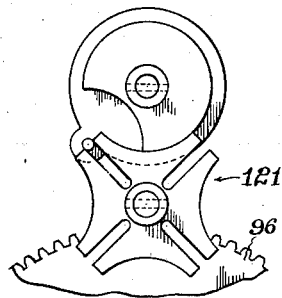
Figure 14:
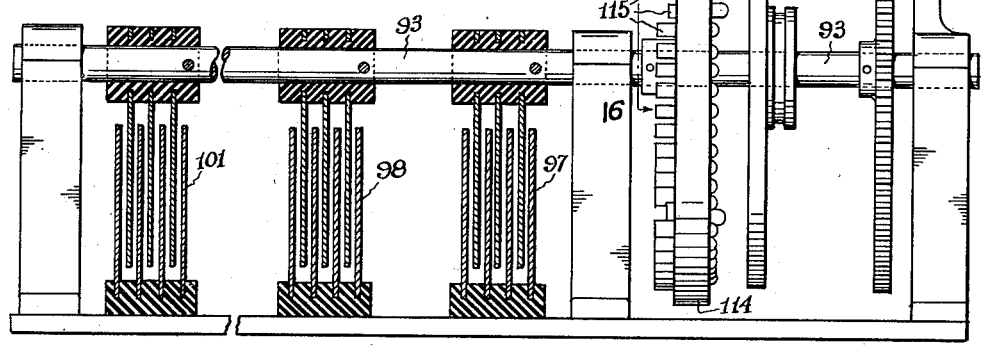
Figure 16:
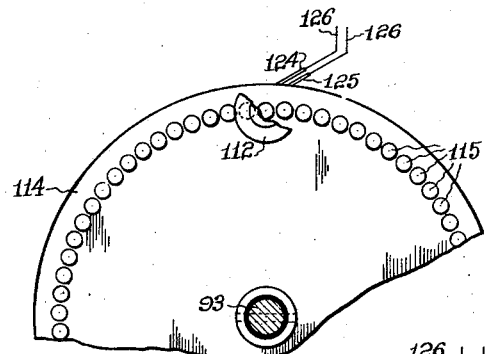
Figure 17:
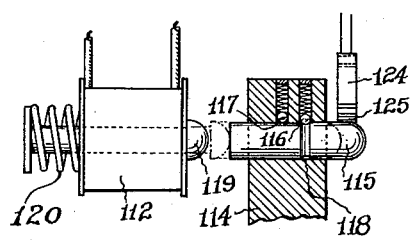
Figure 18:
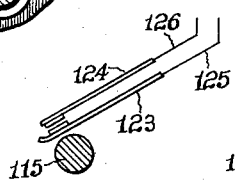
Figure 19:
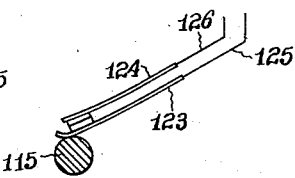

Figs. 6, 7, and 8 are respectively top plan, side elevational and bottom plan views of a contactor or relay shown diagrammatically in Fig. 5;

Figs. 9, 10, 11, and 12 are views which may be considered as taken from the plane 9—9 of Fig. 7 and illustrating contacting portions of the relay in different operative positions;

Fig. 13 is a view illustrating to enlarged scale and more completely a reversing switch mechanism illustrated in simplified form in Fig. 5;

Fig. 14 is a view illustrating to enlarged scale and in more detail a part of the apparatus of Fig. 5;

Fig. 15 is a fragmentary view taken from the plane 15—15 of Fig. 14;

Fig. 16 is a fragmentary view taken from the plane 16—16 of Fig. 14;

Fig. 17 is a fragmentary view illustrating to enlarged scale and with parts broken away for clearness some of the parts of Fig. 14;

Figs. 18 and 19 are diagrammatic views illustrating an electric contactor constituting part of the apparatus of Fig. 14 and Fig. 16 and Fig. 17;

Fig. 20 is another view correlative with Fig. 5 illustrating in more detail a part of the apparatus and electric system of Fig. 1;

Fig. 21 is another view correlative with Figs. 5 and 20 illustrating to enlarged scale and in more detail another part of the apparatus of Fig. 1;

Fig. 22 is a fragmentary view taken from the plane 22—22 of Fig. 21;

Fig. 23 is a view illustrating a modification of the apparatus of Fig. 20 and which may optionally be applied also in the system of Fig. 5 and in the system of Fig. 21;

Figs. 24 and 25 are diagrammatic views illustrating my invention as applied to a self-propelled vehicle in the form of an airplane type projectile as distinguished from the form of my invention in the other figures which is considered as being stationary at a station of observation.

It is known that the sensation of sound as perceived by the human ear, is caused by sound waves in the air proceeding out in all directions from a center at which a vibration occurs. These energy waves are propagated by the successive compressions and rarefactions of the air and in the direction of propagation, or along any radius of propagation from the source, and can be considered as more or less complex sine waves. Transversely of the direction of propagation, the said energy waves are spherical about the center of vibration, and at any point along a radial line of propagation, these spherically curved waves may be considered as a succession of wave fronts. It is with this conception that sound waves are considered herein.

Figure 2:
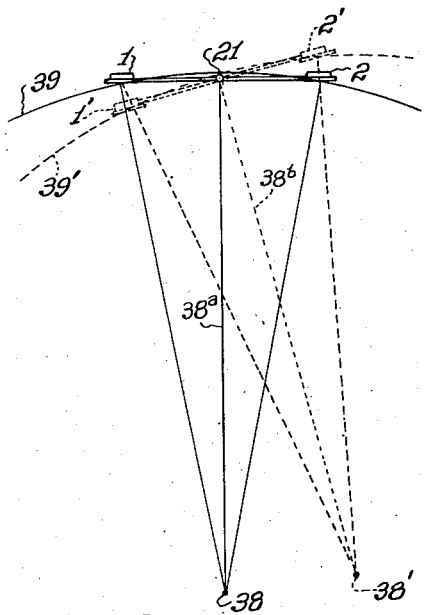
Fig. 2 is a diagrammatic view illustrating certain geometrical relations between a pair of devices responsive to an energy wave impinging thereon to supply electric current to the circuit at the same frequency as the wave, which I may employ and a source of radiant energy waves.

Referring to Fig. 2 of the drawings, 38 represents a source of radiant energy, in this instance being sound, that is to say a source from which sound waves are propagated, and 39 represents one of the successive wave fronts. At 1 and 2 are represented devices responsive to an energy wave impinging thereon to supply electric current to the circuit at the same frequency as the wave, which in this instance are microphones spaced apart. The microphones 1 and 2 are to be considered of the type which generate electric currents in correspondence with the sound waves impinging thereon. The electric waves produced by the two microphones are to be considered algebraically added together. The electric wave produced by each microphone is represented at 40 in Fig. 3 and Fig. 4. If the microphones 1 and 2 are in the solid line position of Fig. 2, the wave front 39 will impinge upon them at the same instants, or simultaneously, and electric waves therefrom will be in synchronism and will add up to the resultant wave 41. If however, the microphones were in the dotted line position, 1'—2' then the wave from 39 would impinge upon the microphones at different times, and the two electric waves therefrom, 40—40 as in Fig. 4, will not be in synchronism but will be out of phase, and their resultant will be that shown at 42. Again, if the microphones are in the solid line position of Fig. 2, but the source of the sound waves is at 38', the wave front, now 39', will reach the microphones 1 and 2 at different times and again the resultant electrical wave therefrom will be that shown at 42.

The resultant wave 41 is therefore the maximum possible electrical wave from the two microphones and occurs only when both microphones are coincident with the wave front, and in all other relative positions of the microphones and the wave front, a lesser electrical current wave or one such as shown at 42, results.

According to my invention, this principle is used in the following manner. The microphones 1 and 2 are mounted to pivot around a center 21. When a wave front impinges on the two microphones and the resulting current, such as 42, is less than the maximum, a source of power is put into operation which rotates the microphones about their center 21 in the direction to increase the resultant electric current toward the maximum, or current wave 41. When the maximum current position for the microphones has been in this manner attained, the microphones are held substantially in that position, which is with both microphones on the wave front. The positions of the microphones thus indicate the center of the wave front and therefore the position of the source of the sound waves. Thus, in Fig. 2, if the microphones are in the positions 1'—2', and the wave is coming from the source 38, the microphones will be moved around into the solid line position and take up the positions at 1 and 2 and the line 38a will be in the direction of the sound source. If the sound source then should move to the position 38', the microphones will be moved around to the positions 1' and 2', and the line 38b will indicate the direction of the sound source 38'.

In the practice of my invention to detect the position, say, of an airplane as the source of sound, and now referring to Fig. 1, I prefer to employ a pair of microphones 1 and 2 rotatable with a vertical shaft 21 or responding to what might be called the compass direction of the source of sound; and a pair of spaced microphones 3 and 4 rotatable about a horizontal axis represented by the shaft 20 and responding to wave fronts to indicate the elevation of the airplane; and three microphones 5, 6, and 7, the first two movable around the vertical axis 21 and the third, or the microphone 7, movable toward and from the axis or shaft 20, for determining the distance away or range of the airplane.

The power supply means to be described and as stated operating in response to the electric waves of microphones 1 and 2, will rotate the shaft 21 until these microphones coincide with the wave front and therefore, in a manner of speaking, point toward the source of sound. And the power source also rotates the microphones 3 and 4 around a horizontal axis until they are both coincident with the wave front and point toward the airplane in an upwardly inclined direction as will be understood. Indicating mechanism is provided to indicate the positions in which the pairs of microphones 1—2 and 3—4 are pointing.

In as much as the radius of the spherical wave front is greater for greater distances away of the airplane, the curvature of the wave front will be correspondingly less for greater distances and more for shorter distances. After the microphones 1—2 and 3—4 have been moved to coincide with the wave front, the microphone 7 which is mounted to move around the axis 21 with the microphones 1 and 2 and to move around the axis 20 with the microphones 3 and 4, may lie beyond or inside of the wave front, and the aforesaid power means is actuated as described to move the microphone 7 into coincidence with the spherical wave front and when coincident therewith its position, together with position of microphones 5 and 6, indicated the curvature of the wave front or the radius thereof and thereby indicates the distance or range of the airplane from the microphone 7.

The three sets of microphones thus indicate respectively the direction of the airplane, its elevation from the ground, and its distance away, and these indications may be used to aim an antiaircraft gun for firing a projectile at the airplane.

The apparatus by which the foregoing mode of operation is carried out is shown generally in Fig. 1 and in more detail in other of the figures to be referred to. Referring to Fig. 1, the electric currents produced by the microphones 1 and 2 go by wires 10 and 11 to wires 12, being connected in parallel and therefore the waves from both microphones being impressed upon the wires 12, and the wires 12 are connected by the wires 14 to a tuner 13, where the waves are tuned for a purpose to be described, and amplified, and thence the amplified current flows by wires 13a to a relay device 17 to be described which, by means of wires 18, controls an electric motor 19 geared to the shaft 21 to move the microphones 1 and 2 to their wave coinciding positions, around a vertical axis. Similarly the current waves from the microphones 3 and 4 go by wires 23 and 24 and are superimposed upon wires 25 and passed to a tuner 26 where they are tuned and amplified and actuate a relay 27 which by way of wires 28 actuates an electric motor 29 geared to a worm sector 31 connected to the shaft 20 to move the shaft 30 and the microphones 3 and 4 therewith around the horizontal axis of the shaft 20 to position the microphones 3 and 4 into coincidence with the wave front.

Similarly again, the current waves from the microphones 5, 6, and 7 are conducted by wires 32, 33, and 34 and superimposed upon wire 35 and passed through a tuner 36 where they are tuned and amplified and made to actuate a relay 43 which by wires 44 effects the operation of an electric motor 37 geared to a screw 46 which upon rotation propels a nut 47 to move the microphone 7.

Referring now to a more detailed description of the apparatus in connection with the microphones 1 and 2, with particular reference to Figs. 5 to 13, the relay 17 will first be described.

This relay may be variously constructed but I prefer to employ one of the type having stationary field coils 48—48 and a movable or rotary coil or wound armature 49 the latter having a shaft 50 rotatably mounted, as shown in Fig. 7. The shaft 50 has a helical spring 51 connected thereto tending at all times to rotate it in the clockwise direction as viewed in Fig. 6. A contact finger 52 is connected to the shaft 50 and moves therewith, and fingers 53 and 54 are loosely mounted on the shaft 50 but are held in frictional engagement therewith by a spring 55 Fig. 7.

The finger 53 has a depending contact 56 overlapping the edge of the finger 52 at one side and a depending insulation post 57 overlapping it on the other side with clearance between the finger and the parts 56 and 57 as shown in Fig. 9. The finger 54 similarly has a depending contact 58 overlapping the finger 53 at one side and a depending insulation post 59 overlapping it on the other side with clearance therebetween as shown in Fig. 9.

Rotation of the shaft by its winding 49 in the counter-clockwise direction, will move the finger 52 out of engagement with the contact 56 and into engagement with the post 57 and this will move the finger 53 out of engagement with the contact 58 and into engagement with the post 59 and will thereafter carry the fingers 53 and 54 with the finger 52. Movement of the finger 52 in the clockwise direction will first engage the contact 56 and further movement will thereby move the finger 53 to engage the contact 58 and then the fingers 53 and 54 will continue to move with the finger 52.

Circuit wires 60, 61 and 62, Fig. 7, are connected respectively to the fingers 54, 53, and 52 and are shown in Fig. 5 as the aforesaid group 18. A source of power such as a battery 63 is connected in the line 61. A magnet 64 is connected in the line 60 and a magnet 65 in the line 62 as shown in Fig. 5 to be energized by the source 63. These magnets operate a device 66 shown diagrammatically in Fig. 5 but in more complete detail in Fig. 13. Upon a shaft 67 is mounted a ratchet wheel 68 and a star wheel 69. The magnets 64 and 65 have plungers 70 and 71, which, when the magnets are energized are pulled into the magnets and cause pawls 72 and 73, selectively, to notch the ratchet wheel 68 ahead one notch. A roller 72a is thereby caused to seat in a notch of the star wheel 69 or to lie upon a projection between a pair of notches, and a bar 73 carrying the roller 72a is thus reciprocated and moves a pair of switch arms 74 and 75 to the solid line or broken line positions causing them to engage with contacts 76 and 77 or 77 and 78. By this arrangement, upon energization of either magnet 64 or 65, the arms 74 and 75 are moved from the position which they happen to occupy, into the other position.

Referring to Fig. 5, when the arms 74 and 75 are in one position, current flows from a source of power such as a battery 79 through the arms to energize the motor 19 in one direction, and when the arms 74 and 75 are moved to the other position the source 79 drives the motor 19 in the opposite direction.

The motor is geared as shown to the shaft 21 for rotating the microphones 1 and 2.

Current from the microphones 1 and 2 in the wires 14 is inductively coupled by a transformer 80 to a tuned circuit to which is connected the grid of a triode 81 the plate circuit of which includes the field windings 48—48 of the relay and a source of power such as a battery 82 as shown in Fig. 5. In the operation of the apparatus thus far described, the relay 17 may be put into operation by closing a hand switch 83. An incoming wave will generate some microphone current in the wires 14 and energize the transformer 80 and the grid of the triode 81 and current will flow to the relay windings 48 and cause the shaft 50 to rotate against the tension of the spring 51 to a position of balance and in so rotating, the contacts 56 and 58 will be disengaged. The motor 19 will be rotating, or may now be started to rotate by closing a hand switch 84 and its direction will be determined by the position to which the switch arms 74 and 75 were last moved.

Figure 3:
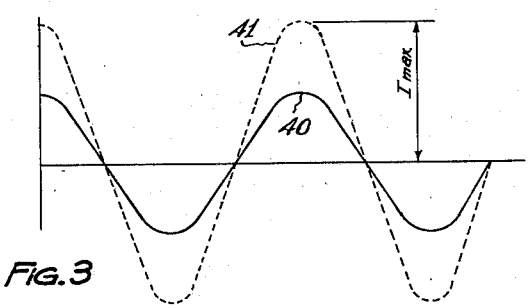
Figs. 3 and 4 are diagrammatic views illustrating certain relations between electric currents generated by the devices of Fig. 2.
Figure 4:
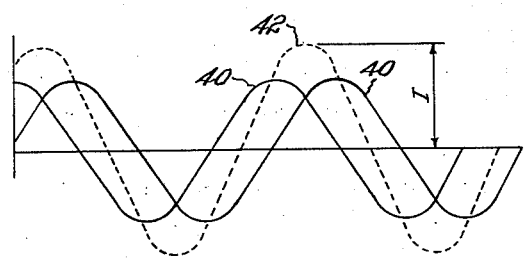

If the motor is moving in the direction to move the microphones 1 and 2 closer into coincidence with the wave front, the sum of their waves as discussed in connection with Figs. 2, 3, and 4 will increase causing the triode 81 to pass more current and move the shaft 50 still farther in the counterclockwise direction carrying the contacts 58 and 56 with it but out of engagement with their fingers, the finger 52 and the finger 53 respectively engaging their posts 57 and 59 as shown in Fig. 10. If however, the motor 19 happens to be moving in the direction to move the microphones 1 and 2 farther out of coincidence with the wave, the microphone current in the wires 14 will be a decreasing current and the triode will pass less current and this will permit the spring 51 to return the finger 52 clockwise into engagement with the contact 56. This will close a circuit through the wires 61 and 62 and energize the magnet 65 causing it to move the switch arms 74—75 to their other position and reverse the motor 19. The motor 19 will then move the microphones 1 and 2 towards the position of coincidence with the wave. Again, if for any reason, due to the position of the microphones with respect to the incoming wave, the closing of the contact 56 should move the microphones farther away from coincidence with the wave, the microphone current will still farther decrease allowing the spring 51 to move the finger 53 in engagement with the contact 58, see Fig. 12, and this will close the circuit through wires 60 and 61 and energize the magnet 64 and throw the switch arms 74 and 75 to the other position to reverse the motor.

It follows that the motor 19 will always be caused to turn in the direction to move the microphones toward the position of coincidence. After coincidence has been reached, at which position the microphones point toward the airplane, the motor 19 will move them slightly beyond coincidence, but this will cause the relay 17 to receive less current or a decreasing current and this will permit the finger 52 to be moved clockwise by the spring 51 and engage the contact 56, and this will cause the switch arms 74 and 75 to be moved to the other position and again reverse the motor 19, moving the microphones back into coincidence and slightly on the other side of that position, causing the finger 52 to first move away from the contact 56 and then back into engagement with it again and again reversing the motor 19.

The microphones 1 and 2 thus continuously hunt back and forth a slight distance on each side of the position of coincidence, the resulting decrease of the microphone current at any time, reversing the motor 19. It follows that the microphones 1 and 2 therefore at all times point toward the airplane whether or not it is moving and the direction of the source of sound thereon is moving.

Fig. 10 shows the finger 52 and contact 56 when the microphone current is increasing and Fig. 11 shows them when it is decreasing, these conditions obtaining, whether the microphone current in the absolute sense is great or whether it is small, and showing that the operation is the same whether the amplitude of the sound wave is great or small.

The position of the microphones 1 and 2 is indicated on a scale 85 over which a pointer 86 connected to the shaft 21 moves.

In Fig. 20 is illustrated that part of Fig. 1 relating to the microphones 3 and 4. The arrangement is similar to that described for the microphones 1 and 2 except of course that the microphones 3 and 4 move about a horizontal axis 31 and the motor 29 turns a worm gear 87 to move the microphones 3 and 4 and a finger 88 indicates the position of these microphones on a scale 89. The switch arms 74A and 75A, the device 66A, the transformer 80A, and the triode 81A all function similarly to the corresponding parts without the suffix A of Fig. 5 causing the microphones 3 and 4 to hunt for the position in which they are coincident with the incoming wave.

With reference to Fig. 21, it will be recalled that the microphones 5 and 6 of Fig. 1 were moved concurrently with the microphones 1 and 2 into coincidence with the wave front and Fig. 21 shows in more detail that part of Fig. 1 for moving the microphone 7 also in coincidence with the wave front to effect a determination of the range by triangulation. Here again the arrangement is similar to that described for the microphones 1 and 2, the parts with the suffix B corresponding to those having the same numbers in Fig. 5. Here however the motor 37 drives the screw 46 to propel the nut 47 to move the microphone 7. And a finger 91 moves over an indicating scale 92. Fig. 22 shows the position of the microphones 5, 6, and 7 when they are all three in coincidence with a wave front 39, and inasmuch as all three microphones lie on a sphere, the scale 92 may be calibrated to indicate the distance away of the center 38 of the sphere.

The invention thus far described utilizes the radiant energy of a source of sound to be converted into electrical energy to affect the device as stated. The invention is not limited to any one form of radiant energy, since such radiant energy, say, such as radio waves would similarly affect this invention when proper energy converters are used to convert this energy into corresponding electrical waves in the device.

The apparatus may be used as above described and gives indications on the scales respectively 85, 89, and 92 of the direction elevation and range of the airplane and these indications may be transmitted to the fire control of the gun. In some cases however it will be highly desirable to tune the apparatus to the frequency of the incoming wave from the source of sound and to tune out local frequencies or local sources of sound thus causing the apparatus to respond more definitely to a single source of sound and the incoming sound waves therefrom. Referring to Fig. 1, a motor-driven shaft 93 is associated with all of the tuners 26, 36, and 13 and also with a filter device 15 and adjustably moves tuning condensers connected to the shaft. The means for rotating the shaft is indicated as in a housing 94 in Fig. 1 and this apparatus will now be more fully described in connection with Figs. 5, 20, and 21, and the apparatus illustrated in Figs. 15 to 19.

In Figs. 5 and 14 is shown a motor 95 geared to a gear 96 on the shaft 93. The shaft 93 is connected to the movable elements of a group of condensers 97 and 98 in the filter 15, a condenser 99 Fig. 5 in the tuner 13, a condenser 100 in the tuner 36 and a condenser 101 in the tuner 26.

In Fig. 5 a source of power such as a battery 102 is connected to the motor 95 to drive it, through a reversing switch shown generally at 103 maintained at one position by a spring 104' and when the reversing switch is in this position, the motor drives the shaft 93 in the direction to turn the condensers in the direction to tune the respective circuits thereof to lower frequencies, these tuning circuits in the tuners 13, 36, and 26 comprising as described above, respectively, the secondaries of the transformers 80, 80B, and 80A and the grids of the triodes 81, 81B, and 81A. The circuit of the filter 15 to be tuned is energized by the primary 104 of a transformer having a secondary 105 connected to a filter circuit comprising inductances 106, 107, and 108, and the condensers 97 and 98 the circuit thus being a well-known filter circuit. The filter circuit is connected to the grid of a triode 109 the plate circuit of which includes a magnet 110 which when sufficiently energized moves the reversing switch 103 to the other position to reverse the motor 95.

The primary 104 of the filter is connected to the wires 12 and therefore to the microphones 1 and 2, although for tuning purposes they could have been connected to either of the other pairs of microphones.

The circuit of the filter 15 may be called a low pass filter and when tuned by the condensers 97 and 98 to a certain frequency, will allow current at lower than the tuned frequency to pass therethrough and energize the grid of the triode 109 sufficiently to operate the magnet 110, and at higher frequencies, the flow of current to the grid will be blocked off. At the tuned frequency, the circuits will be in resonance and pass large current to the magnet 110.

The motor-driven condensers referred to accomplish two results. In connection with a device to be described, the tuning operation by the motor 95 is rendered unresponsive to local frequencies, and is rendered responsive to the frequency of an incoming sound wave to tune the tuners 13, 36, and 26 to this incoming wave. The first of these will now be described.

In order to tune out local frequencies, the switch 83 is moved over to engage a contact 111 to include a magnet 112 in the circuit of the triode 81, Fig. 5, it being understood that the switch 83 in the position illustrated which is the operating position, normally short circuits the magnet 112. A switch 112' controlling the magnet 110 is now opened. The motor 95 is started and a switch 113 may be provided for this purpose. The functions of the filter 15 are therefore for the present eliminated.

Connected to the condenser shaft 93 is a disc 114 Figs. 5 and 14 having a circular series of pins mounted therein and reciprocable to two positions, a solid line position and a broken line position see Fig. 17 and held in either position by spring pressed balls 116 and 117 engageable with a groove 118 in the pins. Energization of the magnet 112 sufficiently will cause its plunger 119 to move outwardly and if a pin 115 is opposite the plunger it will move the pins to the solid line position. Upon deenergizing the magnet 112 a spring 120 will retract the plunger 119.

The condenser shaft 93 and the disc 114 are driven step by step by the motor 95, by means of the well-known Geneva gear shown in Figs. 14 and 15 at 121 and at each position of rest of the gear 96 driven by the motor through this gear, one of the pins 115 comes opposite the magnet plunger 119.

Assume now that the condenser shaft 93 and disc 114 are rotating step by step, and that one or more local waves impinging on the microphones 1 and 2 enter the tuner 13 at the wires 14.

The condenser 99 Fig. 5 while its capacity is being changed by rotation of the shaft 93, will come to a position at which its circuit is in resonance with the incoming wave and this will cause sufficient current to flow in the plate circuit of the triode 81 to operate the magnet 112 and shove one of the pins 115 to its outer position and so indicating the relative position of the capacity of the condenser corresponding to the incoming wave corresponding to a definite tuned frequency of the local sound wave.

After the disc 114 has turned a complete revolution, there will be an outwardly projected pin 115 for each local frequency.

The switch 83 is now moved back to its normal position illustrated and the switch 112' is now closed for normal operation, and the apparatus will now be tuned to the incoming wave from the airplane for the purpose as described, in the following manner. The motor 95 continues to rotate the condensers in the direction determined by the spring 104' at the reversing switch 103, simultaneously tuning the grid circuits of all of the tuners and the filter circuit of the filter 15 to lower and lower frequencies and if it reaches the position of minimum frequency it continues rotating through another similar cycle. The condensers therefore will inevitably come to a position of resonance with respect to the incoming wave which produces in the wires 12 an electrical wave of the frequency of the sound wave. When this resonance point is reached, the filter triode 109 will pass sufficient current to the magnet 110 to operate the reversing switch 103 against the tension of the spring 104' to stop the motor 95 and reverse it. Its reversal tunes the filter circuits to a higher frequency and out of resonance which weakens the magnet 110 sufficiently to let the spring 104' again reverse the motor in the original direction and this repeats, the condensers thereby being driven into resonance and then slightly out of resonance and back again hunting through a small range of frequency for the incoming frequency. The shaft 93 therefore tunes the condensers of the tuners to the incoming frequency for the advantages above referred to.

If now the condensers while rotating toward the resonance position should come into a position in resonance with one of the incoming local waves, and in the absence of any other provisions, the tuning would stop and hunt at that frequency, but this is prevented by the following means.

A switch shown generally at 122 in Figs. 5 and 14 and illustrated more completely in Figs. 17 to 19, is disposed in the path of the rotating pins 115. This switch comprises yieldable switch arms 123 and 124 connected to wires 125 and 126 which as shown in Fig. 5 bridge the magnet 110. The pins 115 which have been projected outwardly as described close this switch, the pins moving from the position of Fig. 18 to that of Fig. 19 and shortcircuiting the magnet 110, rendering it inoperative. Thus the condenser shaft and the condensers continue to rotate passing through the point of resonance of the local frequency or frequencies permitting the shaft 93 to be rotated to the position of resonance for the incoming sound wave from the airplane, and to tune the tuners thereto as described.

While I have shown only two condensers 97 and 98 in the filter 15, it will be understood that any number of such condensers and a corresponding filter circuit may be provided to correspond to a range of local frequencies which it may be desired to tune out.

As above described, the apparatus gives an indication on a scale, for example the scale 85 of Fig. 5 indicates the direction of the airplane. In Fig. 23 is illustrated diagrammatically an apparatus by which the position of the airplane may be indicated on a chart continuously as by a line 127 drawn on a chart 128 by a pen or pencil 129. The chart 128 is wrapped around a cylinder and rotatably driven by an electro-dynamic unit in the nature of a motor 130 receiving current from power lines 131 through an electro-dynamic unit 132 mounted on the shaft 133 of the motor 29 Fig. 20. These units 130 and 132 may be of the commercial Selsyn type and as is well-known, cause the unit 130 to take up the same rotative position as the unit 132 thereby causing the chart 128 to correspondingly rotate with the microphones 3 and 4. The pen 129 is moved longitudinally of the chart by a clock 134 driving a belt 135 upon which the pen 129 is mounted.

The change in elevation of the airplane therefore may be followed by observing the line 127 and its elevation at a future time in seconds may be estimated by exterpolating the line as at 136. The chart may be calibrated in seconds longitudinally and at the estimated point a circuit may be closed to effect firing of the gun. This may be accomplished by means of a switch 137 engaged by an extension 138 on the pen, circuit wires 139 leading to the gun firing control. The other indicating units may be similarly provided with like charts.

In the foregoing the apparatus is described as stationary on the ground and indicating for firing purposes the direction elevation and range of the airplane. In Figs. 24 and 25 is illustrated diagrammatically an explosive projectile in the form of a miniature airplane in which the apparatus is mounted. The projectile 140 is provided with a source of stored power 150 to drive a propeller 151 and has a rudder 152 and elevators 153 the latter being connected to motors 154 and 155 to move them. The motors 154 and 155 may correspond to the motors 19 and 29 of the above-described apparatus and may serve to rotate the rudder 152 and elevators 153 similarly to the apparatus described above which is used to rotate shafts 21 and 20 respectively, which apparatus is generally indicated at 156.

In the operation of this form of my invention, the device 140 is started off and driven by its propeller 151 in the general direction of the airplane to be attacked. The apparatus 156 moves the motors 154 and 155 in correspondence with the direction and elevation of the airplane and steers the device toward the plane following its changes of direction, and colliding therewith. Explosives contained in the device 140 may be exploded by impact with the airplane, firing pins 157—157 being provided on the forward part of the device. Microphones 158 and 159 may be provided to actuate the motors 154 and 155 in a manner similar to actuation of the motors 19 and 29 by the microphones 1—2 and 3—4 as described above. My invention is not limited to the exact details of the apparatus and system disclosed herein. Changes and modifications may be made within the spirit of my invention without sacrificing the advantages thereof and within the scope of the appended claims.

I claim:

1. In an apparatus responsive to the position in space of a source of sound waves with respect to the apparatus, a first group of two sound-responsive current-generating microphones movable in a horizontal plane in fixed spaced relation, a second group of two similar microphones movable in a vertical plane in fixed spaced relation, a third group of three similar microphones, two of which move in a horizontal plane in fixed spaced relation and the third of which is movable toward and from a line connecting the third pair of microphones, three reversible power means for moving the microphones of the three groups respectively into and out of coincidence with the sound wave fronts emanating from the sound source, and three reversing means to control the direction of the three power means, respectively, each reversing means responding to the algebraic sum of the currents generated by one of the groups of microphones, to effect a reversal of the corresponding power means, whenever the said algebraic sum is of decreasing value.

2. In an apparatus responsive to the position in space of a source of sound waves with respect to the apparatus, a pair of sound-responsive current-generating microphones, movable in fixed spaced relation, a third similar microphone movable toward and from a line through the pair of microphones, sound responsive power means for moving the pair of microphones substantially into coincidence with the sound wave fronts emanating from the source, reversible power means for concurrently moving the third microphone toward and from a position of coincidence with said wave fronts, power reversing means for the reversible power means responding to the algebraic sum of the currents generated by the three microphones to effect reversal of the reversible power means whenever the sum is of decreasing value.

3. In an apparatus responsive to the position in space of a source of energy waves with respect to the apparatus, a first group of two energy-responsive current-generating devices movable in a horizontal plane in fixed space relation, a second group of two similar devices movable in a vertical plane in fixed spaced relation, a third group of three similar devices, two of which move in a horizontal plane in fixed space relation and the third of which is movable toward and from a line connecting the third pair of devices, three reversible power means for moving the devices of the three groups respectively into and out of coincidence with the energy wave fronts emanating from the energy source, and three reversing means to control the direction of the three power means, respectively, each reversing means responding to the algebraic sum of the currents generated by one of the groups of devices, to effect a reversal of the corresponding power means, whenever the said algebraic sum is of decreasing value.

4. In an apparatus responsive to the position in space of a source of energy waves with respect to the apparatus, a pair of energy-responsive current-generating devices, movable in fixed relation, a third similar device movable toward and from a line through the pair of devices, energy responsive power means for moving the pair of devices substantially into coincidence with the energy wave fronts emanating from the source, reversible power means for concurrently moving the third device toward and from a position of coincidence with said wave fronts, power reversing means for the reversible power means responding to the algebraic sum of the currents generated by the three devices to effect reversal of the reversible power means whenever the sum is of decreasing value.

5. In an apparatus responsive to the position in space of a source of energy with respect to the apparatus, a first group of two energy detecting devices movable in a direction in a plane in space relation, a third energy detecting device movable in the said plane of the other two devices and on a medial line between them, and movable toward and from a line connecting them, automatic means responsive to the source of energy for moving the devices into and out of coincidence with the energy wave front emanating from the energy source.

6. In an apparatus responsive to the position in space of a source of energy waves with respect to the apparatus, a first group of energy-responsive devices movable in a horizontal plane in spaced relation, a second group of two similar devices movable in a vertical plane in spaced relation, a third group of three similar devices, two of which move in a plane in spaced relation and the third of which is movable toward and from a line connecting the third pair of devices, automatic means responsive to the source of energy and including the respective groups of responsive devices for moving the devices of the three groups respectively into and out of coincidence with the energy wave fronts emanating from the energy source.

HARRY ORNER.